United States Patent
Murakami et al.

(10) Patent No.: US 12,177,239 B2
(45) Date of Patent: *Dec. 24, 2024

(54) ATTACK ANALYZER, ATTACK ANALYSIS METHOD AND ATTACK ANALYSIS PROGRAM

(71) Applicant: DENSO CORPORATION, Kariya (JP)

(72) Inventors: Ryosuke Murakami, Kariya (JP); Reiichiro Imoto, Kariya (JP); Masumi Egawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/851,145

(22) Filed: Jun. 28, 2022

(65) Prior Publication Data

US 2023/0007034 A1    Jan. 5, 2023

(30) Foreign Application Priority Data

Jun. 30, 2021   (JP) .................. 2021-109150

(51) Int. Cl.
*H04L 9/40* (2022.01)
*H04L 67/12* (2022.01)
(Continued)

(52) U.S. Cl.
CPC ........ *H04L 63/1425* (2013.01); *H04L 63/145* (2013.01)

(58) Field of Classification Search
CPC .................. H04L 63/1425; H04L 63/145
(Continued)

(56) References Cited

U.S. PATENT DOCUMENTS

| 11,115,425 | B2* | 9/2021 | Ando | H04L 63/1425 |
| 11,700,270 | B2* | 7/2023 | Mozumdar | H04L 12/40013 |
| | | | | 726/23 |

(Continued)

FOREIGN PATENT DOCUMENTS

| JP | 2019-028506 A | 2/2019 |
| JP | 2019-080119 A | 5/2019 |

(Continued)

OTHER PUBLICATIONS

U.S. Appl. No. 17/851,118, filed Jun. 28, 2022, Reiichiro Imoto.

*Primary Examiner* — Monjur Rahim
(74) *Attorney, Agent, or Firm* — Harness, Dickey & Pierce, P.L.C.

(57) ABSTRACT

An attack analyzer includes: a security log acquisition unit acquiring a security log including an abnormality detection signal generated by a security sensor mounted on an electronic control device constituting part of an electronic control system and indicating that the security sensor has detected an abnormality; an alive signal acquisition unit acquiring an alive signal; a prediction table storage unit storing a prediction table showing a correspondence relationship between a predicted attack route in the electronic control system and a predicted abnormality detection signal predicted to be generated by the security sensor; an attack route estimation unit estimating, using the prediction table, the attack route of an attack received by the electronic control system from the abnormality detection signal and the alive signal included in the security log; and an attack information output unit outputting attack information indicating the attack route.

11 Claims, 8 Drawing Sheets

(51) Int. Cl.
*H04W 4/40* (2018.01)
*H04W 12/088* (2021.01)
*H04W 12/121* (2021.01)

(58) Field of Classification Search
USPC .......................................................... 726/22
See application file for complete search history.

(56) References Cited

U.S. PATENT DOCUMENTS

| | | | |
|---|---|---|---|
| 2001/0039462 A1* | 11/2001 | Mendez | G05B 13/026 |
| | | | 700/45 |
| 2018/0293891 A1* | 10/2018 | Troutman | G08G 1/13 |
| 2019/0182275 A1* | 6/2019 | Ando | G06F 11/3476 |
| 2020/0143053 A1* | 5/2020 | Gutierrez | G06F 21/554 |
| 2020/0150648 A1 | 5/2020 | Horita et al. | |
| 2020/0274729 A1 | 8/2020 | Takada et al. | |
| 2020/0296015 A1* | 9/2020 | Imamoto | H04L 61/00 |
| 2021/0237665 A1* | 8/2021 | Tamura | H04L 63/1441 |
| 2021/0320932 A1* | 10/2021 | Tsurumi | H04L 63/20 |

FOREIGN PATENT DOCUMENTS

| | | | |
|---|---|---|---|
| JP | 2019-125344 A | | 7/2019 |
| JP | 2019174426 A | * | 10/2019 |
| JP | 2020123307 A | | 8/2020 |
| WO | WO-2019084961 A1 | | 5/2019 |

* cited by examiner

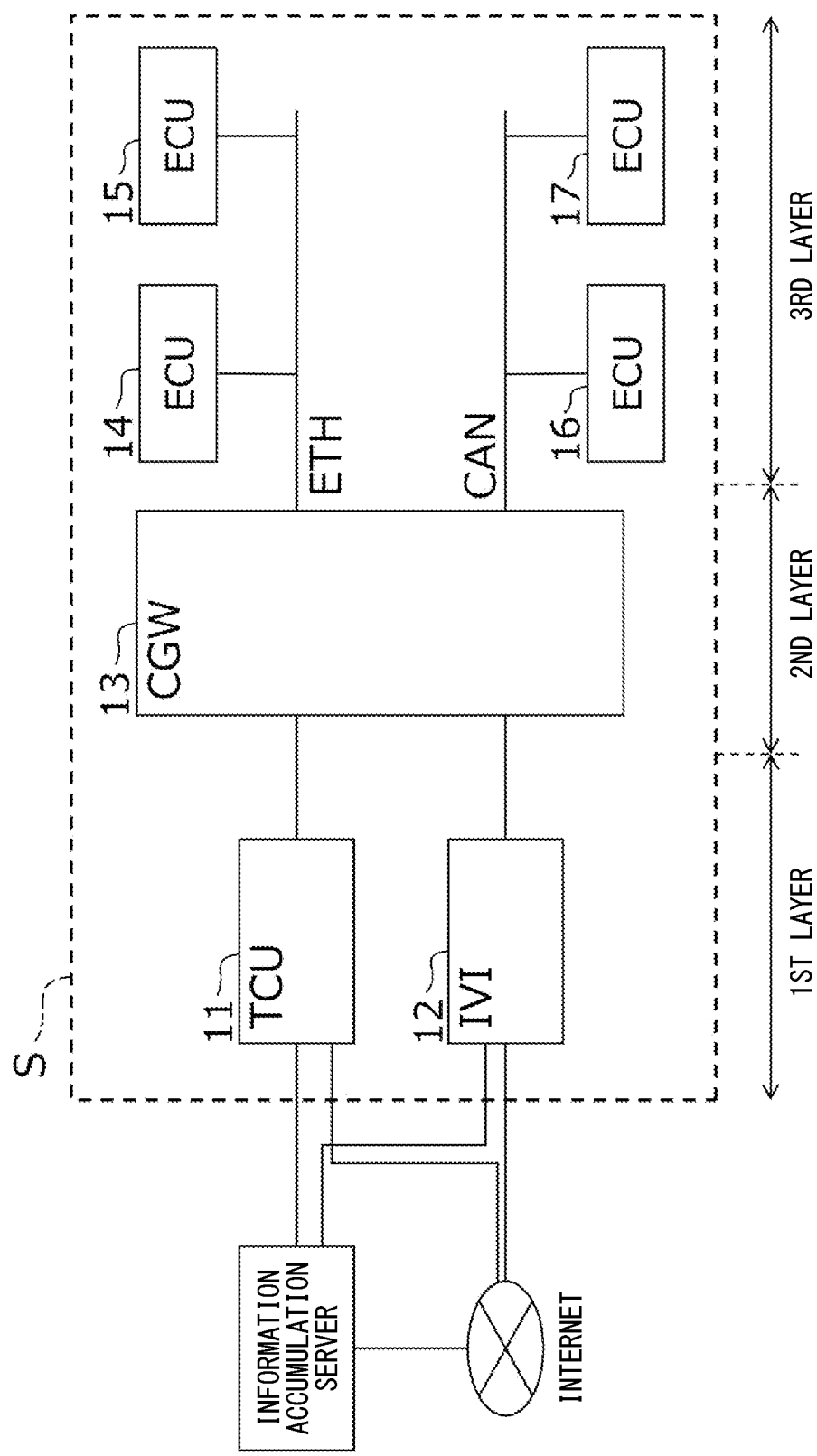

FIG. 4

| EVENT | PREDICTED ATTACK START POINT | PREDICTED ATTACK TARGET | TCU11 ||||| CGW13 ||||| ECU14 |||
|---|---|---|---|---|---|---|---|---|---|---|---|---|---|---|---|
| | | | SECURITY SENSOR A | SECURITY SENSOR B | SECURITY SENSOR C | SECURITY SENSOR D | SECURITY SENSOR E | SECURITY SENSOR F | SECURITY SENSOR G | SECURITY SENSOR H | SECURITY SENSOR I | SECURITY SENSOR J | SECURITY SENSOR K | SECURITY SENSOR L |
| E1 | EXTERNAL | CGW13 | 0 | 0 | 0 | 0 | 1 | 1 | 1 | 0 | 0 | 0 | 0 | 0 |
| E2 | CGW13 | ECU14 | 0 | 0 | 0 | 0 | 0 | 0 | 0 | 1 | 1 | 1 | 0 | 0 |
| E3 | TCU11 | CGW13 | 1 | 0 | 0 | 1 | 0 | 1 | 1 | 0 | 0 | 0 | 0 | 0 |
| ⋮ | | | | | | | | | | | | | | |
| E5 | — | — | 0 | 0 | 0 | 0 | 0 | 0 | 0 | 0 | 0 | 0 | 0 | 0 |

FIG. 5

| EVENT | PREDICTED ATTACK START POINT | PREDICTED ATTACK TARGET | RELIA-BILITY | TCU11 SECURITY SENSOR A | TCU11 SECURITY SENSOR B | TCU11 SECURITY SENSOR C | TCU11 SECURITY SENSOR D | CGW13 SECURITY SENSOR E | CGW13 SECURITY SENSOR F | CGW13 SECURITY SENSOR G | CGW13 SECURITY SENSOR H | ECU14 SECURITY SENSOR I | ECU14 SECURITY SENSOR J | ECU14 SECURITY SENSOR K | ECU14 SECURITY SENSOR L |
|---|---|---|---|---|---|---|---|---|---|---|---|---|---|---|---|
| E1 | EXTERNAL | CGW13 | 0.5 | 0 | 0 | 0 | 0 | 1 | 1 | 1 | 0 | 0 | 0 | 0 | 0 |
| E2 | CGW13 | ECU14 | 0 | 0 | 0 | 0 | 0 | 0 | 0 | 0 | 1 | 1 | 1 | 0 | 0 |
| E3 | TCU11 | CGW13 | 0.4+α | 1 | 0 | 0 | 1 | 0 | 1 | 1 | 0 | 0 | 0 | 0 | 0 |
| ⋮ | | | | | | | | | | | | | | | |
| E5 | — | — | | 0 | 0 | 0 | 0 | 0 | 0 | 0 | 0 | 0 | 0 | 0 | 0 |

FIG. 6

| EVENT | PREDICTED ATTACK START POINT | PREDICTED ATTACK TARGET | RELIABILITY | TCU11 | | | | CGW13 | | | | ECU14 | | | |
|---|---|---|---|---|---|---|---|---|---|---|---|---|---|---|---|
| | | | | SECURITY SENSOR A | SECURITY SENSOR B | SECURITY SENSOR C | SECURITY SENSOR D | SECURITY SENSOR E | SECURITY SENSOR F | SECURITY SENSOR G | SECURITY SENSOR H | SECURITY SENSOR I | SECURITY SENSOR J | SECURITY SENSOR K | SECURITY SENSOR L |
| E1 | EXTERNAL | CGW13 | 0.5 | 0 | 0 | 0 | 0 | 1 | 1 | 1 | 0 | 0 | 0 | 0 | 0 |
| E2 | CGW13 | ECU14 | 0 | 0 | 0 | 0 | 0 | 0 | 0 | 0 | 1 | 1 | 1 | 1 | 0 |
| E3 | TCU11 | CGW13 | 0.5 | 1 | 0 | 0 | 1 | 0 | 1 | 1 | 0 | 0 | 0 | 0 | 0 |
| ⋮ | | | | | | | | | | | | | | | |
| E5 | — | — | | 0 | 0 | 0 | 0 | 0 | 0 | 0 | 0 | 0 | 0 | 0 | 0 |

FIG. 7

| EVENT | PREDICTED ATTACK START POINT | PREDICTED ATTACK TARGET | RELIA-BILITY | TCU11 SECURITY SENSOR A | TCU11 SECURITY SENSOR B | TCU11 SECURITY SENSOR C | TCU11 SECURITY SENSOR D | CGW13 SECURITY SENSOR E | CGW13 SECURITY SENSOR F | CGW13 SECURITY SENSOR G | CGW13 SECURITY SENSOR H | ECU14 SECURITY SENSOR I | ECU14 SECURITY SENSOR J | ECU14 SECURITY SENSOR K | ECU14 SECURITY SENSOR L |
|---|---|---|---|---|---|---|---|---|---|---|---|---|---|---|---|
| E1 | EXTERNAL | CGW13 | 0.5+α | 0 | 0 | 0 | 0 | 1 | 1 | 1 | 0 | 0 | 0 | 0 | 0 |
| E2 | CGW13 | ECU14 | 0 | 0 | 0 | 0 | 0 | 0 | 0 | 0 | 1 | 1 | 1 | 1 | 0 |
| E3 | TCU11 | CGW13 | 0.4+α | 1 | 0 | 0 | 1 | 0 | 1 | 1 | 0 | 0 | 0 | 0 | 0 |
| ⋮ | | | | | | | | | | | | | | | |
| E5 | — | — | | 0 | 0 | 0 | 0 | 0 | 0 | 0 | 0 | 0 | 0 | 0 | 0 |

ATTACK ANALYZER, ATTACK ANALYSIS METHOD AND ATTACK ANALYSIS PROGRAM

CROSS REFERENCE TO RELATED APPLICATION

The present application is based on and claims the benefit of priority of Japanese Patent Application No. 2021-109150, filed on Jun. 30, 2021, the disclosure of which is incorporated herein by reference.

TECHNICAL FIELD

The present disclosure generally relates to a device that analyzes an attack on an electronic control system mounted on a movable body such as an automobile, including an attack analyzer, an attack analysis method, and an attack analysis program.

BACKGROUND INFORMATION

In recent years, technologies for driving support and automated driving control, including V2X such as vehicle-to-vehicle communication and road-to-vehicle communication, have been attracting attention. As a result, a vehicle has a communication function, and so-called connectivity of the vehicle has been promoted. As a result, vehicles are more likely to be subject to cyber attacks such as unauthorized access. Therefore, it is necessary to analyze cyber attacks on vehicles and formulate countermeasures.

SUMMARY

It is an object of the present disclosure to realize an attack analyzer or the like that estimates an attack route with higher accuracy when a cyber attack on an electronic control system is received/observed.

BRIEF DESCRIPTION OF THE DRAWINGS

Objects, features, and advantages of the present disclosure will become more apparent from the following detailed description made with reference to the accompanying drawings, in which:

FIG. 2 is a block diagram illustrating a configuration example of an electronic control system of the first embodiment;

FIG. 4 is an explanatory diagram illustrating a prediction table stored in a prediction table storage unit of the attack analyzer of the first embodiment;

FIG. 5 is an explanatory diagram illustrating a reliability calculation method of a reliability calculation unit according to an example embodiment 1 of the first embodiment;

FIG. 6 is another explanatory diagram illustrating the reliability calculation method of the reliability calculation unit according to an example embodiment 2 of the first embodiment;

FIG. 7 is an explanatory diagram illustrating a reliability calculation method of the reliability calculation unit according to an example embodiment 3 of the first embodiment.

DETAILED DESCRIPTION

Embodiments of the present disclosure will be described below with reference to the drawings.

The present disclosure means the disclosure described in the section of claims or means for solving the problem (i.e., Summary section), and is not limited to the following embodiments. Further, at least the words and phrases in quotation marks mean the words and phrases described in the section of claims or means for solving the problem, and are not limited to the following embodiments.

The configurations and methods described in the dependent claims of the claims section are arbitrary (i.e., non-essential) configurations and methods in the disclosure described in the independent terms of the claims. The configurations and methods of the embodiments corresponding to the configurations and methods described in the dependent claims, and the configurations and methods described only in the embodiments that are not described in the claims are arbitrary configurations and methods in the present disclosure. The configuration and method described in the embodiment when the description of the claims is wider than the description of the embodiment is also an arbitrary configuration and method in the present disclosure in the sense that it is an example of the configuration and method of the present disclosure. In either case, the description in the independent claim(s) provides an essential configuration and method of the present disclosure.

Any effects described in the embodiments are effects obtained by a configuration of an embodiment as an example of the present disclosure, and are not necessarily effects of the present disclosure.

When there are multiple embodiments, a configuration disclosed in each embodiment is not limited to each embodiment, but can be combined across embodiments. For example, a configuration disclosed in one embodiment may be combined with other embodiments. Configurations disclosed in multiple embodiments may be collected and combined.

A difficulty described above is not a publicly known matter but is originally found by an applicant of the present application, and is a fact that confirms/proves non-obviousness of the present application together with a configuration and a method described in the present application.

Figure 1A:
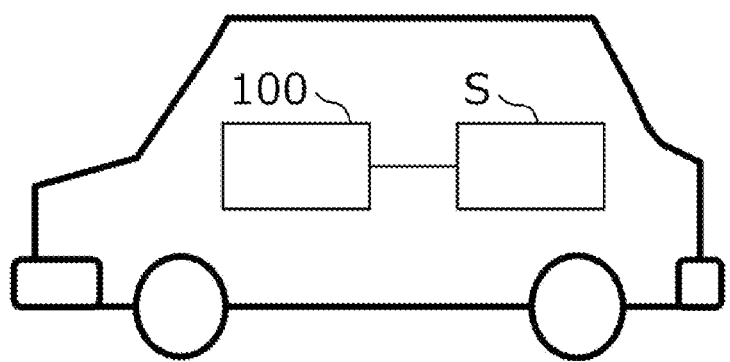
FIGS. 1A and 1B are respectively an explanatory diagram illustrating an arrangement of an attack analyzer according to a first embodiment.
Figure 1B:
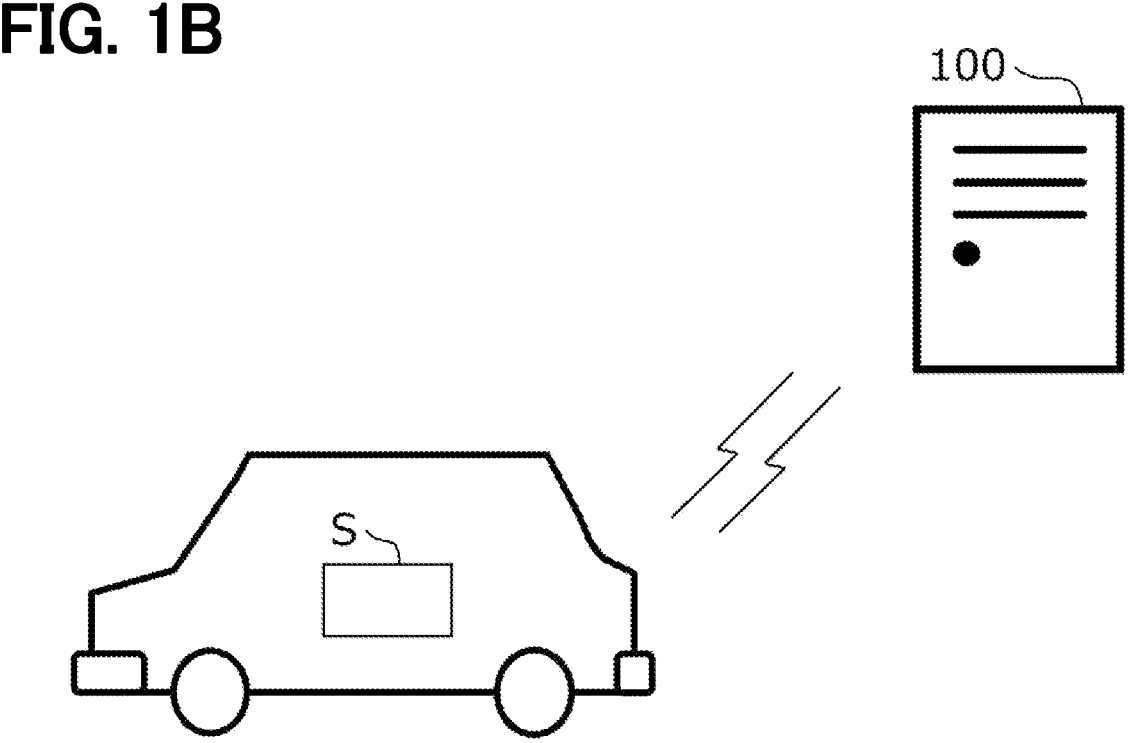

1. First Embodiment (1) Arrangement of an Attack Analyzer 100 and an Electronic Control System S FIGS. 1A and 1B are respectively a diagram illustrating an arrangement of the attack analyzer 100 of the present embodiment. The attack analyzer 100 detects a cyber attack on the electronic control system S, and estimates an attack route of the cyber attack received by the electronic control system S. The attack analyzer 100 may take any arrangement/configuration in which necessary information is obtainable from the electronic control system S. Hereinafter, a cyber attack may be abbreviated as an attack. In addition, an attack may be described as abnormality based on a viewpoint of the electronic control system S affected under the attack.

For example, as shown in FIG. 1A, the electronic control system S and the attack analyzer 100 are "mounted" on a vehicle which is a "moving body," and as shown in FIG. 1B, electronic devices are used. It is assumed that the control system S is "mounted" on a vehicle that is a "moving body," and the attack analysis device 100 is realized by a server device installed outside the vehicle.

The "movable body" refers to an object which is movable, and a travel speed thereof is arbitrary. Naturally, the above also includes a case where the movable object is stopped. Examples of the movable body include, but are not limited to, automobiles, motorcycles, bicycles, pedestrians, ships, aircrafts, and objects mounted thereon. Further, "mounted" includes not only a case where it is directly fixed to the movable body but also the case where it is not fixed to the movable body but moves together with the movable body. For example, the above may be a case where a person riding on the movable body carries the object, or a case where the object is mounted in a load placed on the movable body.

In the case of FIG. 1A, the attack analyzer 100 and the electronic control system S are connected by an in-vehicle network such as CAN (Controller Area Network) or LIN (Local Interconnect Network). Alternatively, any communication method such as Ethernet (registered trademark), Wi-Fi (registered trademark), Bluetooth (registered trademark), or the like can be used for connection. As another example, the function of the attack analyzer 100 can be incorporated in at least one of the electronic control devices constituting the electronic control system S.

In the case of FIG. 1A, the attack analyzer 100 can analyze the cyber attack without delay when the electronic control system S is attacked, and can promptly respond to the cyber attack.

In the case of FIG. 1B, the attack analyzer 100 and the electronic control system S are connected by using a communication means consisting of wireless communication methods such as, for example, IEEE802.11 (Wi-Fi (registered trademark)), IEEE802.16 (WiMAX (registered trademark)), W-CDMA (Connect Wideband Code Division Multiple Access), HSPA (High Speed Packet Access), LTE (Long Term Evolution), LTE-A (Long Term Evolution Advanced), 4G, 5G and the like. Alternatively, Dedicated Short Range Communication (DSRC) can also be used. When a vehicle is parked in a parking lot or housed in a repair shop, a wired communication method can also be used instead of the wireless communication method. For example, a LAN (Local Area Network), the Internet, or a fixed telephone line can be used.

In the case of FIG. 1B, when the electronic control system S mounted on a vehicle is attacked, the server device receives, from the vehicle, a security log generated by a security sensor mounted on an electronic control device constituting the electronic control system S, via a wireless communication network. Therefore, as compared with the case where the attack analyzer 100 is mounted on the vehicle, it takes time to analyze the attack and to feed back the analysis result to the vehicle, but it is possible to reduce the processing load on the vehicle. Moreover, since the abundant resources of the server device can be used, it is possible to execute a large amount of complicated arithmetic operations.

As another arrangement, the following example can be considered. The electronic control system S may be mounted not on the vehicle but on a stationary body. Further, the electronic control system S and the attack analyzer 100 may be mounted on different vehicles and communicate directly or indirectly via a base station or the like.

(2) Configuration of an Electronic Control System S
(a) Overall Configuration

FIG. 2 is a diagram illustrating a configuration example of the electronic control system S. The electronic control system S includes TCU 11, IVI 12, CGW 13, ECU 14, ECU 15, ECU 16, and ECU 17.

The TCU 11 (Telematics Control Unit) is an electronic control unit (ECU) having a communication function, and transmits/receives information by performing communication via an external information accumulation server or the Internet. The TCU 11 is called as an entry point because it can be an entrance for an attack from the outside by communicating with the outside of the electronic control system S.

The IVI 12 (In-Vehicle Infotainment system) is an ECU that has a function of providing information and entertainment, and also has a communication function similar to that of the TCU 11, and the IVI 12 sends and receives information by communicating via an external information accumulation server or the Internet. Since the IVI 12 also communicates with the outside of the electronic control system S, it can be an entrance for an attack from the outside, so the IVI 12 is also called an entry point.

The CGW 13 (Central GateWay) is an ECU having, as its main function, a gateway (GW) function. For example, the information received by the TCU 11 or IVI 12 is transferred to the ECUs 14 to 17 connected via an in-vehicle network such as CAN or LIN or a communication network such as Ethernet (ETH). Further, the information transmitted from the ECUs 14 to 17 is transferred to the TCU 11 and the IVI 12. The CGW 13 can also be equipped with a function other than the gateway function. Further, the attack analyzer 100 described later can be mounted as a function of the CGW 13.

ECUs 14 to 17 are ECUs connected to the CGW 13 via a network. In FIG. 2, the ECU 14 and the ECU 15 are connected via Ethernet. The ECU 16 and the ECU 17 are connected via a CAN, which is an in-vehicle network. The ECUs 14 to 17 may be any ECUs that realize each function of the vehicle, which include electronic control devices for the drive system that control the engine, steering wheel, brake, etc., electronic control devices for the vehicle body that control the meters, power windows, etc., electronic control devices for information systems such as a navigation device, or electronic control devices for safety control system that perform controls to prevent collision with an obstacle or a pedestrian, for example.

In the following description, when not paying attention to the unique features of the above-mentioned TCU 11, IVI 12, CGW 13, ECU 14, ECU 15, ECU 16, and ECU 17, each of them may be simply referred to as an ECU.

(b) Multi-Layer Defense and Layers

In many electronic control systems S, multi-layer defense is adopted in order to enhance the security against attacks. According to multi-layer defense, security functions are provided hierarchically and in multiple layers as countermeasures against attacks, so that even if one countermeasure (that is, the first layer) is breached in the event of an attack, the next countermeasure (that is, the second layer) can still provide defense against attacks, the defense power of the electronic control system can be enhanced. Therefore, in the electronic control system S that employs multi-layer defense, there are a plurality of layers having different security levels. Therefore, the electronic control system S is divided into a plurality of layers according to the security level, and each ECU is classified into one of those layers.

The electronic control system S shown in FIG. 2 has three layers of defense. In this example, TCU 11 and IVI 12 belong to the first layer, CGW 13 belongs to the second layer, and ECUs 14 to 17 belong to the third layer. The TCU 11 and IVI 12 are ECUs having a communication function with the outside, and these ECUs are equipped with a security function for monitoring data entering the inside of the vehicle from the outside of the vehicle. The area monitored by the ECU having such a security function is the first layer. The CGW 13 is, for example, an ECU having a gateway function equipped with a security function for monitoring data communicated between a network to the ECU connected to the outside of the vehicle and a network to an ECU that controls the vehicle. The CGW 13 takes security measures different from those of the TCU 11 and IVI 12, and the area monitored by the CGW 13 has a security level different from that of the first layer, which is the area protected by the TCU 11 and the IVI 12. Therefore, the area monitored by CGW 13 is set as the second layer. It can be said that the ECUs 14 to 17 are in an area in which only the data that has passed the security function of the CGW 13 is communicated and has a security level different from that of the second layer. Therefore, the area to which the ECUs 14 to 17 belong is set as the third layer.

Although the electronic control system S in FIG. 2 has three layers of defense, four or more layers of defense may be provided. For example, the ECU connected via a sub-gateway ECU may be considered as the fourth layer.

Further, although the hierarchy described in the present embodiment is a physical hierarchy starting from the entry point, a functional hierarchy may be used instead of all or part of the physical hierarchy. For example, there may be a case in which a master-slave relationship is set between ECUs.

(c) Security Sensor

Each ECU constituting the electronic control system S is equipped with one or more security sensors that monitor the inside of the ECU and the network to which the ECU is connected. When the security sensor detects an abnormality that has occurred inside the ECU or in the network, the security sensor generates and outputs a security log. The security log contains an abnormality detection signal indicating that the security sensor has detected an abnormality.

Examples of the security sensor include firewalls, proxies, CAN-IDS, CAN filters, TLS, MAC verification, file access monitoring, secure boot, secure repro(gram), CFI, sandbox, authentication and the like.

In addition to the abnormality detection signal, the security log contains abnormal position information indicating a position where the abnormality detected by the security sensor has occurred, identification information for identifying the electronic control system S, and identification information for identifying the ECU equipped with the security sensor, identification information of the security sensor that detected the abnormality, time when the abnormality was detected, number of times the abnormality was detected, order in which the abnormality was detected, information on data content and IP address (source and destination) received before the abnormality was detected, etc. may be included.

(d) Alive Signal

Each ECU has a security sensor generates an alive signal, and transmits the alive signal to a network to which the ECU is connected. The alive signal may also be called as keep-alive information or heartbeat information.

The alive signal is a predetermined signal generated at and having a predetermined cycle, which is then transmitted to the network, and with which the security sensor is determined as to whether it is operating, and/or whether it is normally operating. For example, if the alive signal is not transmitted at all, it is determinable that the security sensor is not operating. Further, if the alive signal is transmitted at a cycle other than the predetermined cycle, or is irregularly transmitted, it is determinable that the security sensor is operating but the operation is not normal. When the alive signal is not the predetermined signal, it is also determinable that the security sensor is operating but the operation is not normal.

Contents of the alive signal are the predetermined signal in the present embodiment, e.g., a known series of numbers. However, the contents of the alive signal may also be security sensor specific information, security sensor setting information and the other information relevant to the security sensor. For example, when the security sensor setting information is used as the contents of the alive signal, an abnormality pattern, a white list, a black list, a transmission cycle, a version information, proof of authentication and the like of the relevant security sensor may be provided as the alive signal.

A transmission timing of the alive signal is set to a predetermined cycle in the present embodiment. Instead, or in addition, the transmission timing of the alive signal may also be an update timing of the setting information of the security sensor, a timing at which a request from other process is received, or a detection timing of a predetermined security event.

In the present embodiment, the subject of transmitting the alive signal is a security sensor that is subject to determination of "life or death" (operating/not operating) based on the alive signal. However, the alive signal may be transmitted from another process or ECU that monitors the security sensor, as a monitoring result of operation of the security sensor.

(3) Configuration of an Attack Analyzer 100

Figure 3:
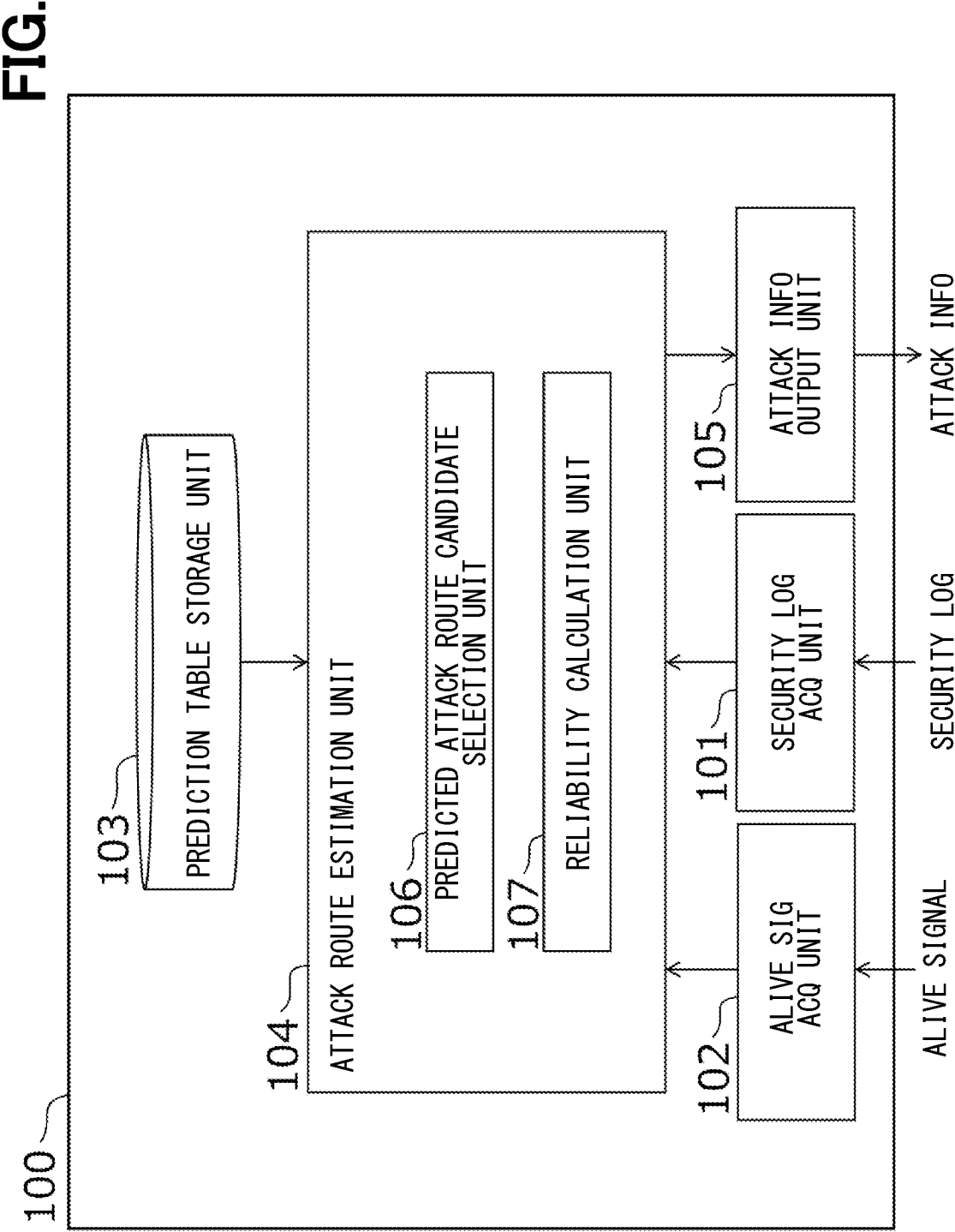
FIG. 3 is a block diagram showing a configuration example of the attack analyzer according to the first embodiment.

The attack analyzer 100 of the present embodiment will be described with reference to FIG. 3. The attack analyzer 100 is a device that detects and analyzes an attack on the electronic control system S described above. The attack analyzer 100 includes a security log acquisition unit 101, an alive signal acquisition unit 102, a prediction table storage unit 103, an attack route estimation unit 104, and an attack information output unit 105. Further, the attack route estimation unit 104 includes a predicted attack route candidate selection unit 106 and a reliability calculation unit 107.

When the attack analyzer 100 is provided in a vehicle, it may be provided by connecting to the electronic control system S via an in-vehicle network. Alternatively, the attack analyzer 100 may be provided inside the electronic control system S. For example, the attack analyzer 100 may be provided as a function of CGW 13 or TCU 11.

The attack analyzer 100 may be composed of a general-purpose CPU (Central Processing Unit), a volatile memory such as RAM, a ROM, a flash memory, a non-volatile memory such as a hard disk, various interfaces, and an internal bus connecting them. Software is executed on the hardware, and thus a function of each functional block illustrated in FIG. 3 can be realized. Of course, the attack analyzer 100 may also be realized by dedicated hardware such as LSI.

In the present embodiment, the attack analyzer 100 assumes the form of an electronic control unit (hereinafter abbreviated as ECU) as a semi-finished product, but the attack analyzer 100 is not limited to such device. For example, the form of parts is a semiconductor circuit or semiconductor module, the form of a semi-finished product is an electronic control device, an electronic control unit, a system board, and the form of a finished product is a server, a workstation, or a personal computer (PC), a tablet, a smartphone, a mobile phone, a navigation system. Note that the attack analyzer 100 may be composed of a plurality of ECUs in addition to a single ECU.

The security log acquisition unit 101 acquires a security log including an abnormality detection signal generated by a "security sensor" mounted on the ECU constituting the electronic control system S and indicating that the security sensor has detected an abnormality. For example, in the case of the arrangement shown in FIG. 1A, the security log output to the in-vehicle network by the security sensor mounted on the TCU 11, CGW 13, ECU 14 to 17, etc. of the electronic control system S is connected to the in-vehicle network is acquired by receiving it by the security log acquisition unit 101. In the case of the arrangement shown in FIG. 1B, the security sensor mounted on the TCU 11, CGW 13, ECU 14-17, etc. of the electronic control system S outputs the security log to the in-vehicle network, and the security log transmitted from the TCU 11 using wireless communication is received by the security log acquisition unit 101 connected to a network such as the Internet.

Here, the "security sensor" refers to a function of monitoring an electronic control unit or a network constituting an electronic control system and outputting a security log when a security event occurs, and the means for realizing the sensor does not matter.

The alive signal acquisition unit 102 acquires "alive signal" of a security sensor mounted on an ECU constituting the electronic control system S. For example, in the case of the arrangement shown in FIG. 1A, the alive signal output to the in-vehicle network by the security sensor mounted on the TCU 11, CGW 13, ECU 14 to 17, etc. of the electronic control system S is acquired by receiving it by the alive signal acquisition unit 102 connected to the in-vehicle network. In the case of the arrangement shown in FIG. 1B, the security sensor mounted on the TCU 11, CGW 13, ECU 14-17, etc. of the electronic control system S outputs the alive signal to the in-vehicle network, and the alive signal transmitted from the TCU 11 using wireless communication is acquired by receiving it by the alive signal acquisition unit 102 connected to a network such as the Internet.

Here, the "alive signal" is a signal directly or indirectly indicating whether the security sensor is operating or not and/or whether the security sensor is normally operating or not.

Note that the security log acquisition unit 101 and the alive signal acquisition unit 102 may be realized as one acquisition unit.

The prediction table storage unit 103 stores a prediction table showing a correspondence between a predicted attack route identified by a predicted attack start point and a predicted attack target in the electronic control system S, and a predicted abnormality detection signal predicted to be generated by the security sensor. The prediction table may sometimes be called as a pattern matching table or a matching table.

FIG. 4 is a diagram showing an example of a prediction table. The prediction table of FIG. 4 is a table that associates which security sensor mounted on each ECU detects an abnormality when there is an attack on the predicted attack target from the predicted attack start point. In FIG. 4, '1' represents a state in which an abnormality is detected, and '0' represents a state in which an abnormality is not detected. That is, the predicted attack start point and the predicted attack target correspond to the "predicted attack route," and 0 or 1 of each security sensor corresponds to the "predicted abnormality detection signal".

In the present embodiment, the predicted attack route is defined by the predicted attack start point and the predicted attack target. However, information on the relevant ECU existing en route from the predicted attack start point to the predicted attack target may be included therein.

In the present embodiment, the patterns of the predicted abnormality detection signals of the security sensors of the TCU 11, CGW 13, and the ECU 14 are used, but the patterns of the predicted abnormality detection signals of the security sensors mounted on the other ECUs may also be used.

Returning to FIG. 3, the attack route estimation unit 104 estimates the attack route of the attack received by the electronic control system S from the abnormality detection signal (included in the security log) using the prediction table. Other embodiments will also consider the "alive" signal that indicates whether the sensor is in a "normal state" or "alive state" capable of detecting an abnormality and sending an abnormality signal, or whether the sensor is in an "abnormal state" or "dead state".

Preferably, the attack route estimation unit 104 has a predicted attack route candidate selection unit 106. More preferably, the attack route estimation unit 104 has a reliability calculation unit 107.

The predicted attack route candidate selection unit 106 selects a predicted attack route candidate from among the predicted attack routes by comparing the abnormality detection signal and the predicted abnormality detection signal using the prediction table. The reliability calculation unit 107 uses the alive signal to obtain "reliability" indicating how certain a predicted attack route candidate is.

Here, the "reliability" may be any indicator as long as it indicates a degree of certainty, and may include not only a numerical value but also a standardized value or a symbol or a set indicative thereof. The "reliability" may also be designated as "predictability," "accuracy of prediction" or the like.

The attack information output unit 105 outputs attack information indicating an estimated attack route estimated by the attack route estimation unit 104. Preferably, the attack information output unit 105 outputs the attack information, estimating, as an attack route, the predicted attack route candidate selected by the predicted attack route candidate selection unit 106. More preferably, the attack information output unit 105 outputs the attack information, estimating, as an attack route, the predicted attack route candidate selected by the predicted attack route candidate selection unit 106 and the reliability obtained by the reliability calculation unit 107.

Hereinafter, as example embodiments, a specific estimation method of the attack route estimation unit 104 and the contents of the attack information output by the attack information output unit 105 will be described with reference to FIGS. 5 to 7. FIGS. 5 to 7 are diagrams respectively illustrating a method of selecting a predicted attack route candidate and a method of calculating reliability using the prediction table of FIG. 4.

(a) Example Embodiment 1

The example embodiment 1 is an example of correcting the reliability obtained from the prediction table by using the alive signal. Hereinafter, the process will be described with reference to FIG. 5.

It is assumed that a security sensor F of the CGW 13 outputs an abnormality detection signal, and the security log acquisition unit 101 receives the abnormality detection signal. Further, it is assumed that a security sensor A of the TCU 11 outputs an alive signal indicating that the operation of the security sensor A itself is abnormal, and the alive signal acquisition unit 102 receives the alive signal.

The predicted attack route candidate selection unit 106 selects, from the prediction table, an event in which the security sensor F detects a predicted abnormality detection signal by comparing the abnormality detection signal with the predicted abnormality detection signal. In an example of FIG. 5, since events in which the security sensor F detects the predicted abnormality detection signal are an event E1 and an event E3, the event E1 and the event E3 are selected as the predicted attack route candidates.

The reliability calculation unit 107 obtains the reliability of the predicted attack route candidate selected by the predicted attack route candidate selection unit 106. For example, the reliability is calculated by, for example, using (i) a ratio of the abnormality detection signal and the predicted abnormality detection signal of each of the predicted attack route candidates, (ii) weighting based on the importance of the sensor, and other predetermined operations.

In the event E1, the reliability is set to 0.5 by a predetermined calculation based on the fact that the abnormality detection signal comes only from the security sensor F, while the predicted abnormality detection signal comes from the security sensors E, F, and G.

In event E3, the reliability is set to 0.4 by a predetermined calculation based on the fact that the abnormality detection signal comes only from the security sensor F, while the predicted abnormality detection signal comes from the security sensors A, D, F, and G.

Further, since the alive signal indicates that "the operation of the security sensor A itself is abnormal," the reliability calculation unit 107 performs processing to increase the reliability of the predicted attack route candidate including, in the route, the TCU 11 that has the security sensor A (corresponding to the "abnormal security sensor").

In the example of FIG. 5, since it is the event E3 that the TCU 11 is "reliably" included in a route between the predicted attack start point and the predicted attack target, a predetermined value, a in the present embodiment, is added to the reliability of the event E3 for setting a new reliability of the event E3. The value a may be a constant or a variable that changes depending on the conditions. It should be noted that the reliability of the event E1 will not be corrected, since the event E1 may have an IVI12 as an entry point, suggesting that the TCU 11 is not necessarily included in the route.

Here, "the operation of the security sensor itself is abnormal" means that the security sensor is not operating or the operation of the security sensor is not normal. In other words, the security sensor itself is "in an abnormal state". For simplicity, in other words, the security sensor is "dead". This abnormal state may be outputting a zero voltage, or refusing to reply to requests for information, or another situation indicating that the security sensor cannot output an abnormality signal indicating that an abnormality is detected or determined.

The attack information output unit 105 outputs attack information using event E1 and event E3, which are the predicted attack route candidates, as the attack routes. At such timing, as the attack route, the reliability (0.5) of the event E1 and the reliability (0.4+α) of the situation E3 may be included in the output.

Note that, in the description of this example embodiment, an example where the alive signal of the security sensor A is received is described. However, even when the alive signal is not received, it is assumed that the security sensor A is not operating and the same processing is performed. That is, "a situation where the alive signal indicates that the operation of the security sensor itself is abnormal" is a concept including "a situation where the operation of the security sensor itself is indicated abnormal by an absence of the alive signal (i.e., not receiving the alive signal)". The same applies to an example embodiment 2 described later.

Further, in the description of the present embodiment, the reliability is firstly obtained without using the alive signal, and then the reliability is corrected by using the alive signal. However, the reliability calculation may be performed by not using such a two-step calculation. The same applies to an example embodiment 3 described later.

According to the present example embodiment, since the reliability is obtained by using the alive signal in addition to the conventional abnormality detection signal, the estimation accuracy of the attack route estimation unit 104 can be improved. Furthermore, since the security sensor employs a reliability calculation method that takes into account the possibility that the operation has become abnormal due to an attack, the accuracy of attack route estimation can be improved.

(b) Example Embodiment 2

In the example embodiment 2, the alive signal is used to limit or narrow or sift a part of the prediction table to be used to obtain the reliability. Hereinafter, the process will be described with reference to FIG. 6.

The abnormality detection signal and the alive signal to be received are the same as those in the first embodiment. That is, it is assumed that the security sensor F of the CGW 13 outputs an abnormality detection signal, and the security log acquisition unit 101 receives this abnormality detection signal.

Further, it is assumed that the security sensor A of the TCU 11 outputs an alive signal indicating that the operation of the security sensor A itself is abnormal, and the alive signal acquisition unit 102 receives the alive signal.

The operation of the predicted attack route candidate selection unit 106 is the same as that of the example embodiment 1. That is, the predicted attack route candidate selection unit 106 selects, from the prediction table, an event in which the security sensor F detects a predicted abnormality detection signal, by comparing the abnormality detection signal with the predicted abnormality detection signal.

In an example of FIG. 6, since the events in which the security sensor F detects the predicted abnormality detection signal are the event E1 and the event E3, the event E1 and the event E3 are selected as the predicted attack route candidates.

The reliability calculation unit 107 obtains the reliability of the predicted attack route candidate selected by the predicted attack route candidate selection unit 106. However, if the alive signal indicates that "the operation of the security sensor A itself is abnormal," the predicted abnormality detection signal corresponding to the security sensor A (corresponding to the "abnormal security sensor") is not used to calculate the reliability.

In the example embodiment 2 as well, the reliability is calculated using the same calculation as in the example embodiment 1. In the event E1, the reliability is set to 0.5 by a predetermined calculation based on the fact that the abnormality detection signal comes only from the security sensor F, while the predicted abnormality detection signal comes from the security sensors E, F, and G. On the other hand, in the event E3, the abnormality detection signal comes only from the security sensor F, while the predicted abnormality detection signal comes from the security sensors A, D, F, and G. However, since the alive signal indicates that the operation of the security sensor A itself is abnormal, the predicted abnormality detection signal of the security sensor A is not used for calculating the reliability. As a result, the reliability is set to 0.5.

The attack information output unit 105 outputs attack information using event E1 and event E3, which are predicted attack route candidates, as attack routes. This time, as the attack route, the reliability (0.5) of the event E1 and the reliability (0.5) of the event E3 may be included in the output.

According to this example embodiment, since the reliability is obtained by using the alive signal in addition to the conventional abnormality detection signal, the estimation accuracy of the attack route estimation unit 104 can be improved. Further, since the security sensor employs a reliability calculation method that takes into account the possibility that the operation has become abnormal due to the attack, the accuracy of attack route estimation can be improved.

(c) Example Embodiment 3

The example embodiment 3 is different from the example embodiments 1 and 2, and is an example showing that the operation of the security sensor is normal. Hereinafter, the process will be described with reference to FIG. 7.

The abnormality detection signal to be received is the same as that in the example embodiment 1. Namely, it is assumed that the security sensor F of the CGW 13 outputs an abnormality detection signal, and the security log acquisition unit 101 receives the abnormality detection signal. Then, in this example embodiment 3, it is assumed that a security sensor J of the ECU 14 outputs an alive signal indicating that the operation of the security sensor J itself is normal, and the alive signal acquisition unit 102 receives the alive signal.

The operation of the predicted attack route candidate selection unit 106 is the same as that of the first embodiment. That is, the predicted attack route candidate selection unit 106 selects, from the prediction table, an event in which the security sensor F detects a predicted abnormality detection signal, by comparing the abnormality detection signal with the predicted abnormality detection signal. In an example of FIG. 7, since the events in which the security sensor F detects the predicted abnormality detection signal are the event E1 and the event E3, the event E1 and the event E3 are selected as the predicted attack route candidates.

The method of obtaining the reliability in the reliability calculation unit 107 is the same as that in the example embodiment 1. That is, the reliability of the event E1 is 0.5, and the reliability of event E3 is 0.4.

Further, since the alive signal indicates that "the operation of the security sensor J itself is normal," the reliability calculation unit 107 performs processing to raise the reliability of the predicted attack route candidate that does not include the ECU 14 having the security sensor J (corresponding to the "normal security sensor") in the route.

In an example of FIG. 7, since it is the event E1 and the event E3 that the ECU 14 is not included in the route between the predicted attack start point and the predicted attack target, a predetermined value, i.e., a in this example embodiment 3, is added to the reliability of event E1 and event E3, which serves as a new reliability. The value a may be a constant or a variable that changes depending on the conditions.

Here, "the operation of the security sensor itself is normal" means that the security sensor is operating and the security sensor is operating normally.

The attack information output unit 105 outputs attack information using the event E1 and the event E3, which are predicted attack route candidates, as the attack routes. This time, the reliability of the event E1 (0.5+α) and the reliability of the event E3 (0.4+α) may be included in the output as the attack route.

According to the example embodiment 3, since the reliability is obtained by using the alive signal in addition to the conventional abnormality detection signal, the estimation accuracy of the attack route estimation unit 104 can be improved. Further, since the reliability calculation method that takes into account that the operation of the security sensor is normal is adopted, the accuracy of attack route estimation can be improved.

(d) Other Example Embodiments

In the example embodiment 1, whether or not the reliability correction is necessary is determined based on whether or not an ECU includes a security sensor whose operation is abnormal is included in the predicted attack route. Such a determination scheme is the same as the one that determines whether or not the reliability correction is necessary based on whether or not a security sensor whose operation is abnormal is included in the predicted attack route.

Further, in the example embodiment 1, the necessity of correcting the reliability may be determined depending on whether or not a layer to which an ECU having a security sensor whose operation is abnormal belongs is included in the predicted attack route.

The same applies to the example embodiment 3.

In the example embodiments 1 to 3, all of the predicted attack route candidates selected by the predicted attack route candidate selection unit 106 are output from the attack information output unit 105 as attack routes, but only a part of the predicted attack route candidates may be output as attack routes. For example, the predicted attack route candidates having the top three reliabilities may be output as attack routes.

In the example embodiments 1 to 3, only the event having the predicted attack route in the prediction table is picked up, but in addition, an erroneous response of the security sensor itself may be additionally picked up as an event. In the examples of FIGS. 4 to 7, an event E5 is the one indicating an erroneous response of the security sensor itself.

(4) Operation of an Attack Analyzer 100

Figure 8:
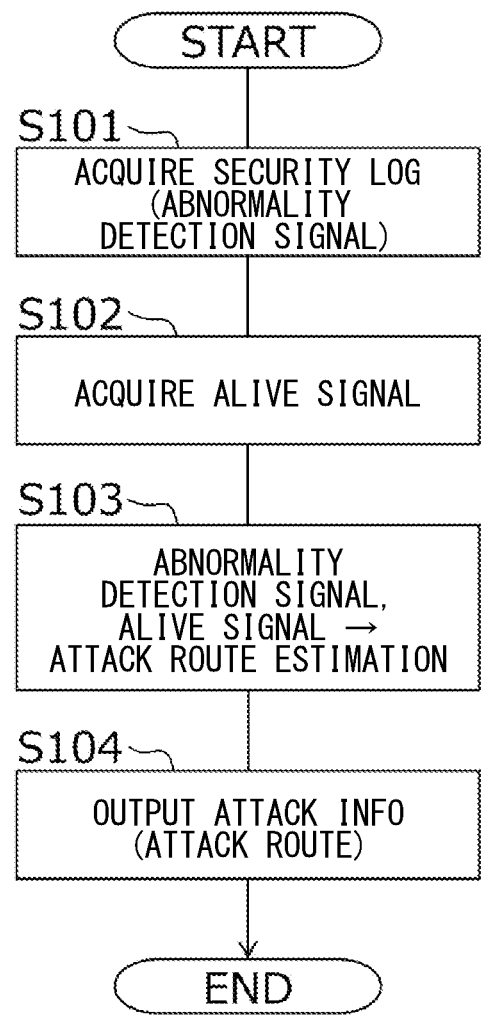
FIG. 8 is a flowchart showing an operation of the attack analyzer according to the first embodiment.

The operation of the attack analyzer 100 will be described with reference to FIG. 8. FIG. 8 not only shows an attack analysis method performed by the attack analyzer 100, but also shows a processing procedure of an attack analysis program that can be executed by the attack analyzer 100. An execution order of processes are not limited to the one shown in FIG. 8. That is, the order may be changed as long as there are no restrictions such as a relationship in which a result of a preceding step is used in a certain step.

The attack analyzer 100 includes a prediction table storage unit 103 for storing a prediction table showing a correspondence between (i) the predicted attach route identified by the predicted attack start point and the predicted attack target in the electronic control system S and (ii) the predicted abnormality detection signal predicted to be generated by the security sensor.

In S101, a security log is acquired, which (i) is generated by a security sensor mounted on an electronic control device constituting the electronic control system S and (ii) includes an abnormality detection signal indicating that the security sensor has detected an abnormality.

In S102, an alive signal of a security sensor is acquired.

In S103, a prediction table is read from the prediction table storage unit 103, and an attack route of an attack received by the electronic control system S is estimated from the abnormality detection signal included in the security log acquired in S101 and the alive signal acquired in S102.

Then, in S104, the attack information indicating the attack route estimated in S103 is output.

(5) Summary

As described above, according to the attack analysis device 100 of the present disclosure, when the electronic control system S is subjected to a cyber attack, the reliability of the estimated attack route is obtained by using the alive signal of the security sensor mounted on the electronic control device constituting the electronic control system S.

Since the alive signal is a signal that allows objective evaluation of the life or death (e.g., operation) of the function of the security sensor and the normality/abnormality of the operation of the security sensor, by using the alive for the evaluation of the reliability of the attack route, the attack route can be estimated more accurately than the method of using the conventional abnormality detection signal only.

The alive signal can also be used to estimate a damage caused by the attack. For example, it is possible to estimate a situation in which the security sensor is invalidated by an attack or a situation in which the ECU is operated/hijacked by an attacker due to an attack.

2. Other Embodiments

In the first embodiment, the reliability of the attack route is obtained by using the alive signal and the contents of the alive signal. However, the setting information of the security sensor exemplified as the contents of the alive signal can also be output to the in-vehicle network as a signal different from the alive signal. When such security sensor setting information is used, the alive signal does not necessarily have to be used to obtain the reliability of the attack route. Examples of security sensor setting information include security sensor abnormality patterns, whitelists, blacklists, transmission cycles, security sensor version information, certificates, and the like.

When the setting information of the security sensor is used instead of the alive signal, the present disclosure can be grasped as having the following aspect.

An attack analyzer of the present disclosure includes:
   a security log acquisition unit acquiring a security log including an abnormality detection signal generated by a security sensor and indicating that the security sensor has detected an abnormality, the security sensor mounted on an electronic control device constituting an electronic control system;
   an alive signal acquisition unit that acquires setting information of the security sensor;
   a prediction table storage unit storing a prediction table showing a correspondence relationship between a predicted attack route in the electronic control system and a predicted abnormality detection signal predicted to be generated by the security sensor;
   an attack route estimation unit estimating, using the prediction table, the attack route of an attack received by the electronic control system from the abnormality detection signal and the setting information included in the security log; and
   an attack information output unit outputting attack information indicating the attack route.

3. Conclusion

The features of the attack analyzer and the like in each of the embodiments of the present disclosure have been described above.

Since the terms used in the embodiments are examples, the terms may be replaced with terms that are synonymous or that include synonymous functions.

The block diagram used for the description of the embodiment is obtained by classifying and arranging, as respective blocks, functions of various kinds which may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order (e.g., re-arranged) as long as there is no restrictions such as a relationship in which results of preceding other steps are used in one step.

The terms such as first, second, to N-th (where N is an integer) used in each of the embodiments and in claims are used to distinguish two or more configurations and methods of the same kind and are not intended to limit the order or superiority/priority.

Each of the embodiments is provided based on an assumption of providing a vehicle attack analyzer for analyzing an attack on an electronic control system mounted on a vehicle, but the present disclosure encompasses, unless otherwise limited within the scope of the claims, other dedicated or general-purpose devices.

Further, as an example form of the attack analyzer of the present disclosure, the following can be mentioned. Examples of a form of a component include a semiconductor device, an electronic circuit, a module, and a microcomputer. Examples of a form of a semi-finished product include an electronic control device (i.e., electronic control unit or ECU) and a system board. Examples of a form of a finished product include a cellular phone, a smartphone, a tablet computer, a personal computer (PC), a workstation, and a server. The example forms may further include a device having a communication function and the like, such as for example, a video camera, a still camera, and a car navigation system, for example.

In addition, necessary functions such as an antenna and a communication interface may be added to the attack analyzer.

It is assumed that the attack analyzer of the present disclosure is used for the purpose of providing various services, especially by being used on the server side. For providing such services, the attack analyzer of the present disclosure is used, the method of the present disclosure is used, and/or the program of the present disclosure is executed.

Further, the present disclosure is implemented not only by dedicated hardware having a configuration and a function described in relation to each of the embodiments, but by a combination of (i) a program for implementing the present disclosure, which is recorded on such a recording medium as memory, a hard disk and the like, and (ii) general-purpose hardware including dedicated or general-purpose CPU, memory, or the like, capable of executing the program.

A program stored in a non-transitory, tangible storage medium (for example, an external storage device (a hard disk, a USB memory, a CD/BD, or the like) of dedicated or general-purpose hardware, or stored in an internal storage device (a RAM, a ROM, or the like)) may be provided to dedicated or general-purpose hardware via a recording medium, or from a server via a communication line without using the recording medium. In such manner, it is possible to always provide a latest, up-to-date function by updating the program.

In summary, an attack analyzer includes:
a security log acquisition unit acquiring a security log (i) including an abnormality detection signal generated by a security sensor and (ii) indicating that the security sensor has detected an abnormality, the security sensor associated with an electronic control device constituting part of an electronic control system;
a failure information acquisition unit acquiring failure information indicating that a failure occurred in the electronic control device;
a prediction table storage unit storing a prediction table showing a correspondence relationship between (i) a predicted attack route associated with the electronic control system and (ii) a predicted abnormality detection signal predicted to be generated by the security sensor;
an attack route estimation unit estimating, using the prediction table, the attack route of an attack received by the electronic control system based at least partly on the security log including the abnormality detection signal and the failure information; and
an attack information output unit outputting attack information indicating the attack route.

INDUSTRIAL APPLICABILITY

The attack analyzer of the present disclosure is mainly intended for or targeting a device that analyzes a cyber attack received by an electronic control system mounted on an automobile, but may also be intended for or targeting a device that analyzes an attack on a normal system that is not mounted on an automobile.

What is claimed is:

1. An attack analyzer comprising:
a security log acquisition unit acquiring a security log (i) including an abnormality detection signal generated by a security sensor and (ii) indicating that the security sensor has detected an abnormality, the security sensor associated with an electronic control device constituting part of an electronic control system;
an alive signal acquisition unit acquiring an alive signal of the security sensor indicating whether the security sensor is operating or not and/or whether the security sensor is normally operating or not;
a prediction table storage unit storing a prediction table showing a correspondence relationship between (i) a predicted attack route associated with the electronic control system and (ii) a predicted abnormality detection signal predicted to be generated by the security sensor;
an attack route estimation unit estimating, using the prediction table, the attack route of an attack received by the electronic control system based at least partly on the security log including the abnormality detection signal and the alive signal; and
an attack information output unit outputting attack information indicating the attack route, wherein
the attack route estimation unit includes a predicted attack route candidate selection unit selecting a predicted attack route candidate from among the predicted attack routes by comparing the abnormality detection signal and the predicted abnormality detection signal using the prediction table, and
the attack information output unit outputs the attack information, which is the predicted attack route candidate, as the attack route.

2. The attack analyzer of claim 1, wherein
the attack route estimation unit further includes a reliability calculation unit calculating a reliability of the predicted attack route candidate using the alive signal, and
the attack information output unit outputs the attack information, which is the predicted attack route candidate and the reliability, as the attack route.

3. The attack analyzer of claim 2, wherein
when the alive signal indicates that the operation of the security sensor itself is abnormal, the reliability calculation unit raises the reliability of the predicted attack route candidate including the abnormal security sensor in the attack route.

4. The attack analyzer of claim 2, wherein
when the alive signal indicates that the operation of the security sensor itself is abnormal, the reliability calculation unit refrains from using the predicted abnormality detection signal corresponding to the abnormal security sensor for the calculation of the reliability.

5. The attack analyzer of claim 2, wherein
when the alive signal indicates that the operation of the security sensor itself is normal, the reliability calculation unit raises the reliability of the predicted attack route candidate that does not include the normal security sensor in the attack route.

6. The attack analyzer of claim 1, wherein
the alive signal is a signal transmitted in a predetermined cycle by the security sensor.

7. The attack analyzer of claim 1, wherein
the predicted attack route is identified by a predicted attack start point and a predicted attack target.

8. The attack analyzer of claim 1, wherein
the electronic control system and the attack analyzer are mounted on a movable body.

9. The attack analyzer of claim 1, wherein
the electronic control system is mounted on a movable body, and
the attack analyzer is a server device disposed outside of the movable body.

10. An attack analyze method performed by an attack analyzer including a prediction table storage unit storing a prediction table showing a correspondence relationship between a predicted attack route in an electronic control system and a predicted abnormality detection signal predicted to be generated by a security sensor, the attack analyze method comprising steps of:
acquiring a security log (i) including an abnormality detection signal generated by the security sensor and (ii) indicating that the security sensor has detected an abnormality, the security sensor mounted on an electronic control device constituting the electronic control system;

acquiring an alive signal of the security sensor indicating whether the security sensor is operating or not and/or whether the security sensor is normally operating or not;

estimating an attack route of an attack received by the electronic control system from the abnormality detection signal and the alive signal included in the security log by reading the prediction table;

outputting attack information indicating the attack route;

selecting a predicted attack route candidate from among the predicted attack routes by comparing the abnormality detection signal and the predicted abnormality detection signal using the prediction table; and outputting the attack information, which is the predicted attack route candidate, as the attack route.

11. A tangible, non-transitory storage medium storing instructions to control a computer to serve as an attack analyzer including a prediction table storage unit storing a prediction table showing a correspondence relationship between a predicted attack route in an electronic control system and a predicted abnormality detection signal predicted to be generated by a security sensor, the instructions to be executed by the computer comprising steps of:

acquiring a security log including (i) an abnormality detection signal generated by the security sensor and (ii) indicating that the security sensor has detected an abnormality, the security sensor mounted on an electronic control device constituting part of the electronic control system;

acquiring an alive signal of the security sensor indicating whether the security sensor is operating or not and/or whether the security sensor is normally operating or not;

estimating an attack route of an attack received by the electronic control system from the abnormality detection signal and the alive signal included in the security log by reading the prediction table;

outputting attack information indicating the attack route;

selecting a predicted attack route candidate from among the predicted attack routes by comparing the abnormality detection signal and the predicted abnormality detection signal using the prediction table; and outputting the attack information, which is the predicted attack route candidate, as the attack route.

* * * * *